Jan. 3, 1950   H. PREHN   2,493,263
TIRE CHAIN AND ATTACHMENT MEANS THEREFOR
Filed Oct. 2, 1947   3 Sheets-Sheet 1
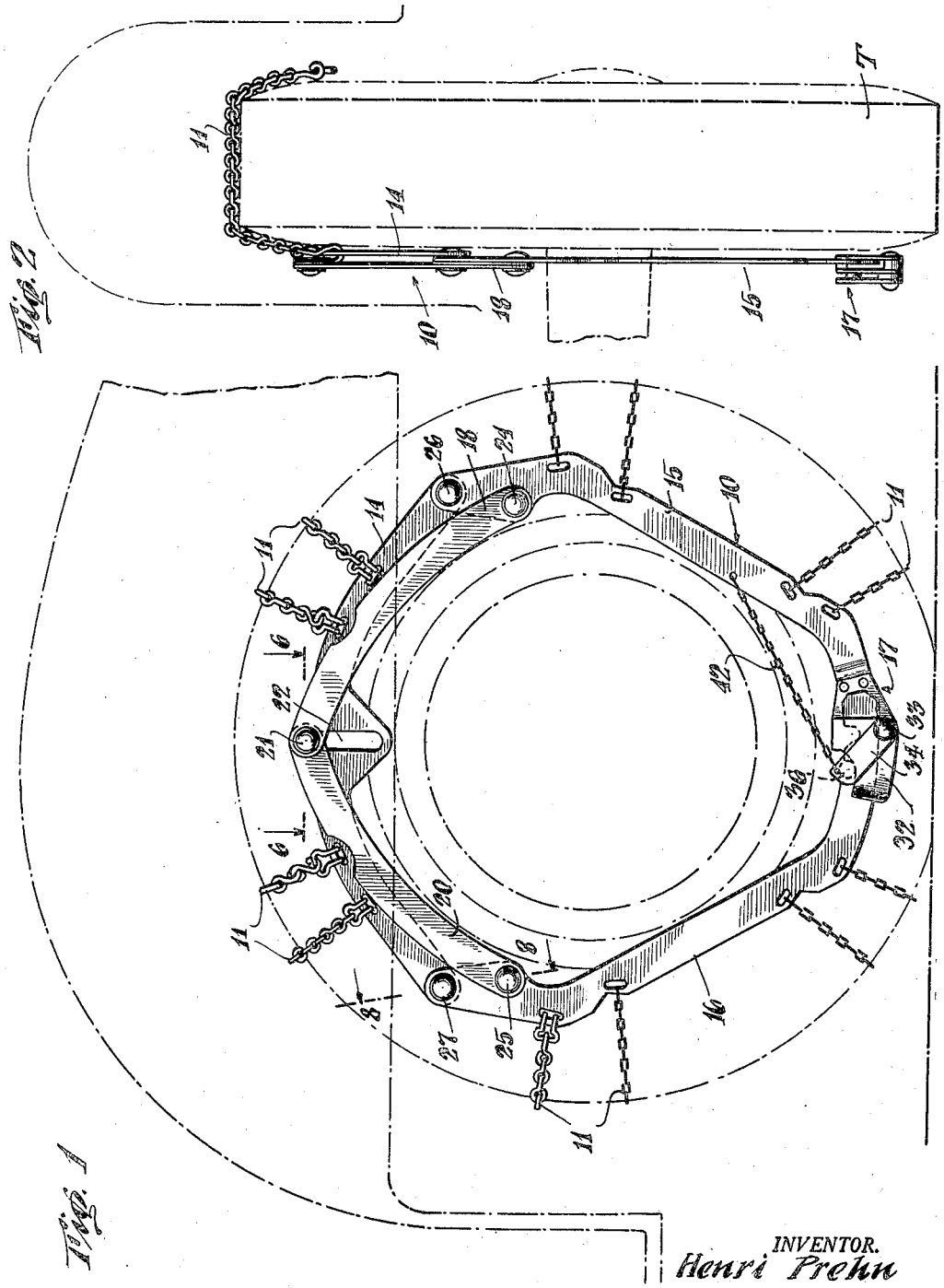
INVENTOR.
Henri Prehn
BY
Duell and Kane
ATTORNEYS

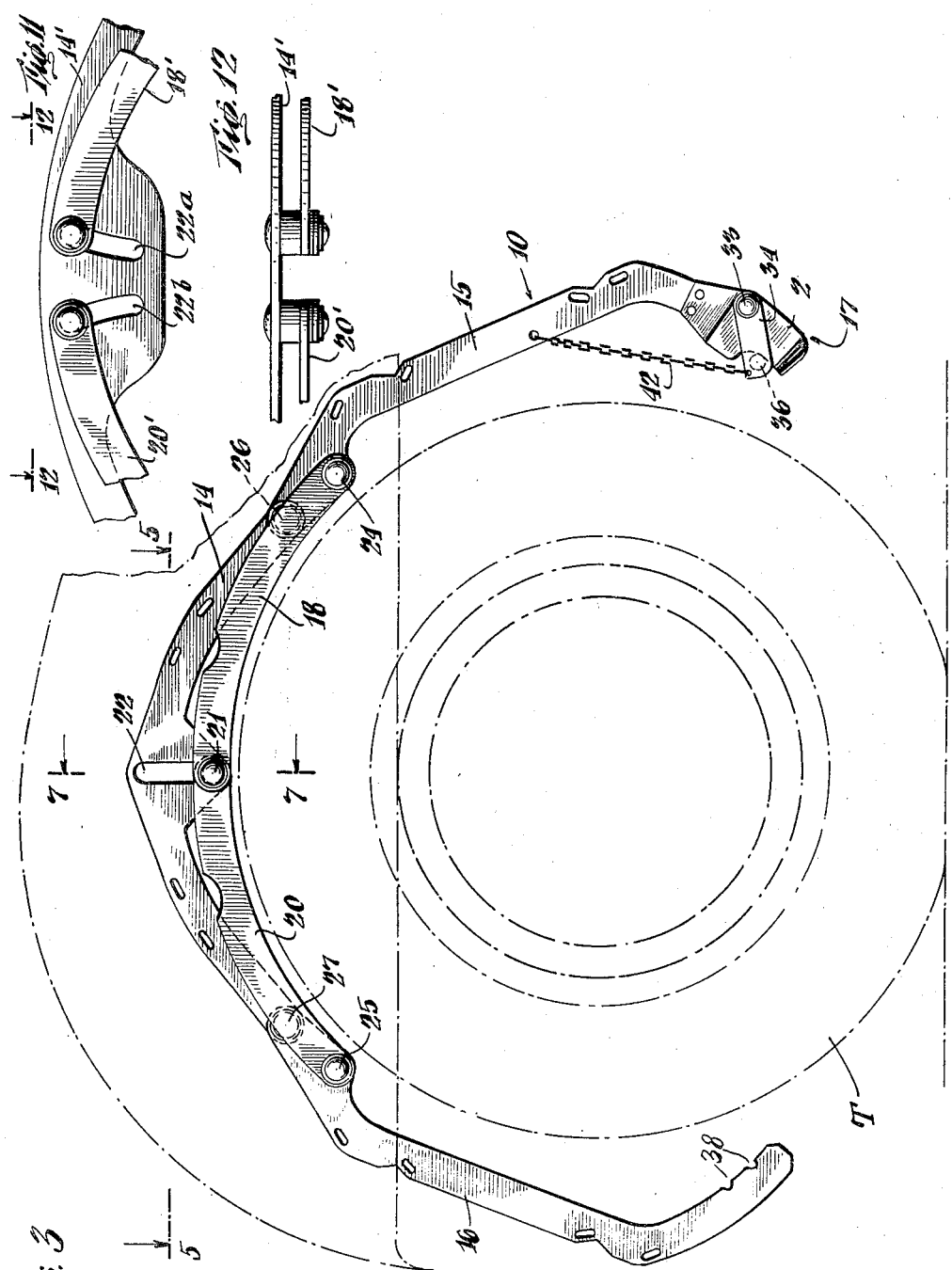

Jan. 3, 1950           H. PREHN           2,493,263
TIRE CHAIN AND ATTACHMENT MEANS THEREFOR
Filed Oct. 2, 1947           3 Sheets-Sheet 3
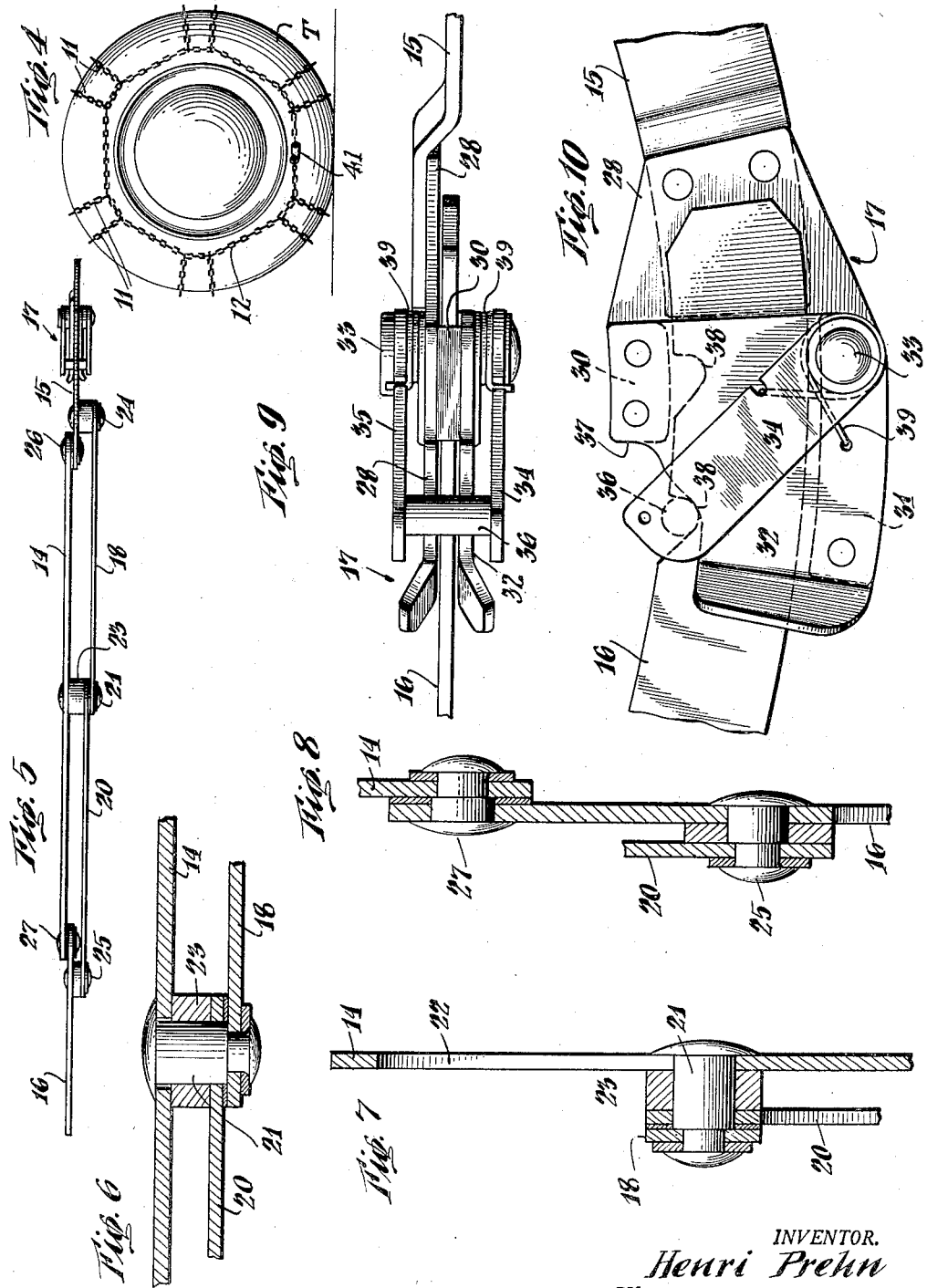
INVENTOR.
Henri Prehn
BY
Duell and Kane
ATTORNEYS Patented Jan. 3, 1950

2,493,263

UNITED STATES PATENT OFFICE 2,493,263

TIRE CHAIN AND ATTACHMENT MEANS THEREFOR

Henri Prehn, Roslyn, N. Y., assignor to Associated Development and Research Corporation, New York, N. Y., a corporation of New York Application October 2, 1947, Serial No. 777,447

8 Claims. (Cl. 152—213)

This invention relates to an improved antiskid attachment for vehicle wheels.

Modern automobile design has developed the construction of the fenders or mudguards to an extent wherein at the rear wheels particularly, the exterior side surface of the wheel is covered almost to the hub cap. Whatever the aesthetic values of such fender design, it has made the wheel almost inaccessible for the attachment of conventional tire chains, and the motorist frequently foregoes the use of chains entirely because of the extreme difficulty of applying them.

It is therefore an object of the present invention to provide an improved tire chain and attachment means which facilitates the application and removal of full circumference tire chains to the wheels of vehicles.

It is an object of the invention to provide a tire chain and attachment device in which the chain may be properly affixed to the wheel without the necessity of jacking up the wheel or lying beneath the vehicle to manipulate the usual inside locking links.

It is another object of the invention to provide an anti-skid chain for vehicles which may be applied from a crouching position in front of the vehicle wheel.

It is another object of the invention to provide an anti-skid attachment for vehicle wheels in which during the application to a wheel it is unnecessary to roll or move the vehicle in order to complete the securement about the full periphery of the wheel.

It is another object of the invention to provide a tire chain assembly for a vehicle wheel including an attachment ring which may be opened to permit the ring to be passed to the rear of the wheel, and having self-aligning locking means which will snap into closed position behind the wheel as the attachment ring is closed.

Other features and advantages of this invention will be apparent from the following detailed description thereof and reference to the accompanying drawings in which Fig. 1 is a side elevation, looking from the inside of the wheel, showing the attachment ring in latched position.

Fig. 2 is a front elevation of the wheel, with the chain attached.

Fig. 3 is a side elevation of the attachment ring in full open position preparatory to being closed about the inside of the wheel, the cross chains having been eliminated to emphasize the structure of the attachment ring;

Fig. 4 is a side elevation looking toward the wheel from the front showing the chain after the attachment thereof;

Fig. 5 is a plan view looking in the direction of the arrows 5—5 of Fig. 3;

Fig. 6 is a section taken through the upper pivot on lines 6—6 of Fig. 1;

Fig. 7 is a vertical elevation, in section, taken on lines 7—7 of Fig. 3;

Fig. 8 is a section taken on lines 8—8 of Fig. 1;

Fig. 9 is a top plan view of the attachment ring latch in closed position;

Fig. 10 is a front elevation of said latch;

Fig. 11 is a partial vertical elevation of a second form of the invention; and

Fig. 12 is a plan section taken on lines 12—12 of Fig. 11.

Referring now to Fig. 1, a preferred embodiment of the invention includes an attachment ring 10 composed of rigid, pivotally interconnected sectors which may be closed to a radius approximately equal to the radius from the hub to the center of the tire, and may be opened into arcuate shape having a radius greater than the full tire radius. To said sectors are attached the ends of cross chains 11 which at the front of the wheel affix to a conventional circumferential tie chain 12. It will be noted that the lowermost cross chains are disposed sufficiently on each side of the vertical center line to clear the flattened area of road contact of a properly inflated tire. It is therefore unnecessary in applying the present invention to a tire to pass any cross chain beneath the tire in such road contact area.

To the uppermost or "guide" sector 14 of the attachment ring are pivotally attached the ends of the right and left latching sectors 15, 16. Sector 15 is provided with a latch or lock structure 17 with which the end of sector 16 automatically aligns, as later described. Adjacent their upper pivot points, sectors 15 and 16 pivotally carry guide levers 18 and 20 which are pivotally secured by a stud or rivet 21 which passes slidably through an elongated slot 22 provided at the center of the sector 14. As is apparent from Figs. 6 and 7, the levers 18 and 20 are separated from the sector 14 by a spacer 23 so that the ends of the upper cross chains may be attached to sector 14 without interference with free movement of said levers.

At their lower end, levers 18 and 20 are respectively pivotally attached to the sectors 15 and 16 at pivots 24 and 25, the locations thereof being uniformly beneath and uniformly offset inwardly from the pivot points 26 and 27 at which the said sectors 15 and 16 connect with the sector 14. The length of slot 22 and the levers 18 and 20 permit the ring to be opened to form an arc having a radius greater than that of the tire T, as shown in Fig. 3. The spacing and inward offset of the said pivot points 24, 25 is related to the length of the slot 22 so that, (see Fig. 3) when the attachment ring is opened to its maximum as determined by the length of said slot 22, the pivots 24 and 25 do not overthrow with respect to the pivots 26 and 27. Such construction avoids any toggle action which might make it difficult to close the ring after it had been fully opened.

Levers 18 and 20 are of the same length, and because neither can move independently along slot 22, they insure that the lower ends of sectors 15 and 16 will come together in the proper horizontal alignment for securement by lock 17, as presently described.

In the embodiment of Figs. 11 and 12, the central sector 14' has a pair of slots 22a and 22b within which are guided the ends of levers 18' and 20' said levers being pivotally attached to sectors 15 and 16 as previously shown and described. Although this construction permits the sectors 15 and 16 to be individually, rather than conjointly, moved, such movement will be controlled or guided to bring their free ends into proper alignment for latching. Although slots are preferred because of ease of manufacture, the ends of the respective levers may be guided in channels or equivalent.

Referring now to Figs. 9 and 10, the lock 17 includes a plate 28 riveted to the offset lower end of the sector 15 and supporting by means of upper and lower spacers 30, 31 respectively, an outer plate 32. The said plates 28 and 32 are outwardly flared at their ends to form the mouth portion as indicated in Fig. 9. Spacers 30 and 31 allow the end of the sector 16 to pass freely between the plates 28 and 32. Pivotally carried as by a pin 33 extending through the plates 28 and 32 and the lower spacer 31 is a latch comprising arms 34, 35 and a rigid cross bar 36. One or more springs 39 urge the latch counter-clockwise of Fig. 10. A vertical end wall 37 limits clockwise movement of the latch. The upper edge of sector 16 has one or more sloping notches 38 within which the bar 36 seats when the latch is in home position. When the latch is seated, no force insufficient to shear the bar 36 will cause sectors 15 and 16 to separate. Under the influence of centrifugal force created by rotation of the wheel under high-speed driving conditions, latch arms 34, 35 tend to rotate counter-clockwise of Fig. 10 to seat bar 36 more securely in the notch.

The offset at the lower end of the sector 15 provides for correct alignment of the plates 15 and 16 when the latch is in closed position, eliminating compound or torsional stresses under load.

In applying either embodiment of the device to a tire, the operator assumes a crouching position in front of the wheel, grasps the sectors 15 and 16 at a location intermediate the ends thereof and opens the ring to the arcuate shape shown in Fig. 3. The cross chains and the front peripheral chain 12 are therefore between the operator and the ring 10, the lock link 41 of said chain being, of course, open at this point.

The operator then inserts the upper edge of the ring beneath the fender and moves it upwardly to a position where it clears the tire. It may then be pushed rearwardly and downwardly to a position behind the tire. The respective cross chains will, at this stage, be extending across the tread of the tire in approximately their final position. The front securement chain hangs limp. The operator then moves the sectors 15 and 16 toward each other and because of the control exercised by levers 18 and 20, or levers 18' and 20' of the second embodiment, the latch end of sector 15 and the free end of sector 16 will approach each other in proper alignment for the end of the sector 16 to enter between the latch plates 28 and 32 and above the lower spacer 31. The offset relationship of the respective sectors to each other, and the inherent rigidity of the unit, are such that sector 16 comes uniformly to latching position, and the operation need only bring the sectors 15 and 16 toward each other to cause sector 16 to enter the latch. The cross bar 36 will drop into position in one or the other of the notches 38 according to the size of the tire. The operator need then only pick up the loose ends of the front chain and snap said ends together with the conventional latching link. Elastic spreaders or equalizers (not shown) may be used, although actual road tests indicate that they are unnecessary.

It will be noted from Fig. 1 that there is a symmetry of the sectors and levers comprising the attaching ring 10. The weight of the latch 17 and that of levers 18 and 20 and the respective pivots counterbalance sufficiently to prevent any material unbalance of the wheels.

For opening the lock 17, there is provided a light chain 42 secured to latch arm 34 and sector 15.

In removing the assembly, it is desirable that the latch 17 be at the bottom of the wheel. The operator then unlatches chain link 41 and grasps sectors 15 and 16, catching chain 42 with the fingers as he does so to press on said chain. This rotates the latching arm clockwise and disengages the bar 36 thereof from the notch 38, whereupon the sectors 15 and 16 are spread into the Fig. 3 position. The ring is then lifted upwardly and forwardly over the tire, and then downwardly under the fender skirt for complete removal.

The attachment ring 10 will remain closed even during a puncture or blowout, because the structure will be displaced relative to the tire and springs 39 will hold the latch arm in sealed position. Momentary road shock against latch 17 will be taken up by the rigid separator plate 31. It will be observed that there is insufficient clearance between the top of said plate and the bottom of plate 16 to permit the latch arm from driving upwardly sufficient to disengage from the notch. If the pivot 21 should strike the road, the resultant outward thrust on levers 18 and 20 will be transmitted to sectors 15 and 16, and will be effectively restrained by the lock.

Thus, among others, the several objects of the invention as aforenoted are achieved. Obviously numerous changes in construction and rearrangement of the parts might be resorted to without departing from the spirit of the invention as defined by the claims.

I claim:

1. An anti-skid chain for vehicle wheels, including a plurality of pivotally interconnected rigid sectors which may be opened into an arc having a radius greater than the radius of the tire whereby inter-connected sectors may be passed rearwardly over said tire to a position at the rear wall thereof; two of said sectors having cooperating locking means at their free ends to permit said ends to be inter-connected; lever means pivotally connected to each other and to said last named sectors for controlling the movement thereof, to bring the free ends of said sectors into alignment for securement by said locking means; cross chains secured to the respective sectors for disposition cross-wise of the tread of the tire; and means for securing the free ends of said cross chains.

2. An anti-skid chain for a vehicle wheel, comprising a central sector to the respective ends of which are pivotally attached sectors of substantially equal length, said sectors being adapted collectively to form a closed ring having a radius less than the radius of the outer rim of said wheel, or to be opened into arcuate shape having a radius substantially greater than said wheel; lever means pivotally inter-connected to each other and to the respective second named sectors, said lever means being guided for movement by said central sector and controlling movement of said other sectors to bring the free ends thereof into alignment when said sectors are moved to ring forming position; cooperating latch means at the free ends of said second named sectors to releasably secure the same in ring forming position; cross chains extending from said sectors to pass across the rim of said wheels; and a tie chain secured to the free ends of said cross chains for holding same in said cross-rim position.

3. An anti-skid chain for vehicle wheels, comprising a central sector having a radial slot intermediate its ends; sectors pivotally attached to said central sector at the respective ends thereof, said sectors being collectively adapted to be closed into ring formation having a radius less than the maximum radius of said wheel or to be opened into arcuate formation having a radius substantially greater than the radius of said wheel; cooperating latching means at the free end of said second-named sectors to releasably secure the same in ring forming position; guide levers pivotally attached at one end to each of said second-named sectors and pivotally connected at their other ends by means in slidable engagement with said slot, whereby said levers permit only controlled conjoint movement of said second named sectors; cross chains secured to the respective sectors for extension across the rim of said wheel; and a tie chain secured to the free ends of said cross chains to maintain the cross-rim position thereof.

4. An anti-skid chain for vehicle wheels, comprising a central sector; sectors pivotally attached to the ends of said central sector, said sectors being collectively adapted to be closed to a ring formation having a radius less than the radius of said wheel or to be opened to form an arc having a radius greater than that of said wheel; cooperating latching means at the ends of said second named sectors to releasably hold the same in ring forming position; means for controlling movement of said second named sectors to bring the ends thereof into aligned position for latching the same, said means including a lever pivotally attached to each of said second named sectors adjacent the point of pivotal attachment thereof with said central sector and means for slidably securing the opposite ends of said levers to said central sector for guided movement relative thereto; cross chains affixed to said sectors for passage across the rim of said wheel; and a circuitous flexible member affixed to the free ends of said cross chains for maintaining the same in said cross-rim position.

5. An anti-skid device for vehicle wheels, including an attachment structure comprising a plurality of pivotally inter-connected rigid sectors which may be opened into an arcuate shape having a radius greater than the radius of said wheel, or closed to ring formation having a radius less than the radius of said wheel, two of said sectors having cooperating latching means for securement thereof when said structure is in ring formation; and means for aligning the free ends of said sectors for latching engagement thereof, said means including a lever pivotally attached to each of said two sectors and slidably secured to another of said plurality of sectors, said levers being of equal length and symmetrically disposed with respect to each other.

6. An anti-skid device for vehicle wheels, including an attachment structure including a central sector and other sectors pivotally attached thereto and depending therefrom, said sectors being arranged to be opened into an arcuate shape having a radius greater than the radius of the wheel and to be closed into a ring formation having a radius less than that of the wheel, said depending sectors being rotatable toward each other during said ring-forming operation and having cooperating latching means for releasable securement; and means for controlling movement of said dependent sectors with respect to each other to bring the ends thereof into alignment for such latching operation, said means including rigid links pivotally attached to each of said depending sectors and to said central sector, said links being of equal length and symmetrically disposed with respect to each other, the point of pivotal attachment of said levers to said depending sectors being beneath and displaced inwardly of the points of attachment of said sectors with said central sector.

7. An anti-skid device for vehicle wheels, including an attachment structure including a central sector and other sectors pivotally attached thereto and depending therefrom, said sectors collectively being arranged to open into arcuate shape having a radius greater than the radius of the wheel and closable into ring formation, having a radius less than that of the wheel, the free ends of said depending structure being brought together during said ring forming operation; and means for automatically aligning said free ends, said means including a guideway formed in said central sector, rigid links pivotally attached to each of said depending sectors and slidably engaging with the guideway formed in said central sector, the point of pivotal attachment of said links with said depending sectors being uniformly below and uniformly inwardly offset from the points of said sectors with said central sector, the movement of said links within said guideway being insufficient to permit the said points of attachment of said links with said sectors from being overthrown relative to the points of attachment of said depending sectors with said central sector.

8. An anti-skid chain for vehicle wheels, including a support structure comprising a plurality of pivotally interconnected rigid sectors which may be opened to an extent sufficient to permit said structure to pass rearwardly over the vehicle tire to a position at the rear wall thereof, two of said sectors having cooperating locking means whereby they may be secured one to the other; a linkage pivotally connected to each of said two last-named sectors and to a common third sector for constraining the ends of each of said sectors to move in arcuate paths which meet at a predetermined point, whereby the locking means on said sectors will always be brought into mutual registry; a flexible tie chain, and cross chains for extending across said tire between said tie chain and said attachment structure.

HENRI PREHN.

REFERENCES CITED

The following references are of record in the file of this patent:

UNITED STATES PATENTS

| Number | Name | Date |
| --- | --- | --- |
| 1,511,685 | Spiro | Oct. 14, 1924 |
| 2,326,618 | Carlson et al. | Aug. 10, 1943 |
| 2,328,808 | Holtz | Sept. 7, 1943 |